even pipes 18 with shallow chamfered surfaces 24 do not cut or

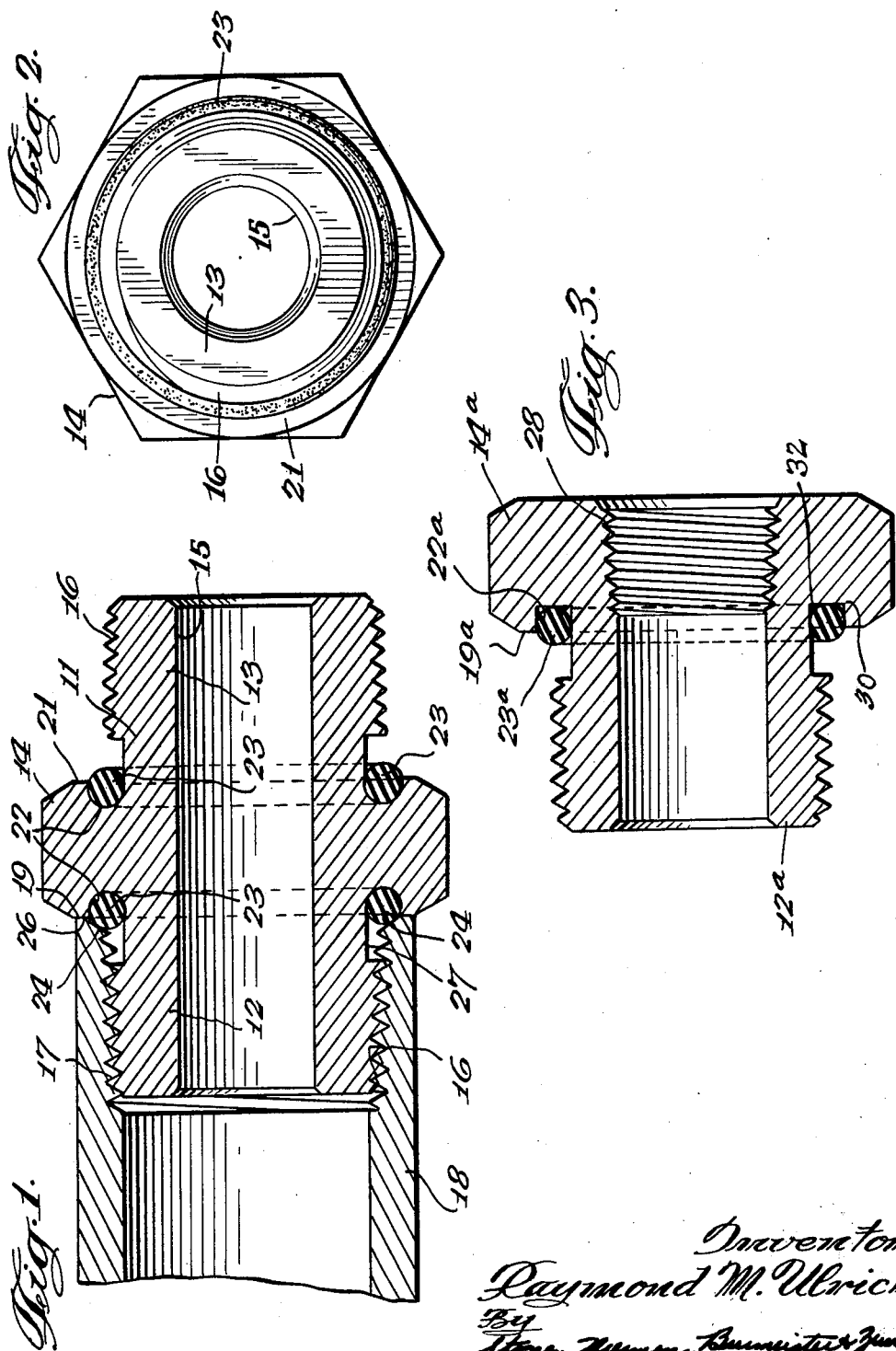

United States Patent Office 3,074,748
Patented Jan. 22, 1963

3,074,748
THREADED PIPE CONNECTION
Raymond M. Ulrich, Roanoke, Ill., assignor to Ulrich Foundation, Inc., Roanoke, Ill., a corporation of Illinois
Filed Mar. 24, 1961, Ser. No. 98,119
8 Claims. (Cl. 285—347)

This invention relates generally to fluid couplings or fittings, and more particularly to a leak-proof coupler for use with a threaded pipe.

The present invention utilizes a compliant washer or O-ring which is disposed within a chamber located between a pipe and pipe fitting for the purpose of providing a fluid tight seal. With such a construction, it is not necessary to use pipe thread compounds to insure a tight joint between the fitting and the pipe, and further, the fitting and pipe may be engaged with less torque than required with conventional pipes and pipe fittings which utilize sealing compounds. Patent No. 2,343,235, to Bashark discloses an O-ring sealed device. Prior to the present invention, however, it has not been possible to use this type of a sealing device with conventional threaded pipe, that is, pipe of the National Standard type. It is an object of the present invention to provide a coupler for a threaded pipe which utilizes an O-ring seal.

It is conventional to provide a threaded pipe with a chamfered surface between the threads and the pipe end in order to remove burrs and the like and to make it easier to engage the threads of the pipe with mating threads. Where the pipe is threaded on its inner surface, a reamer is used to remove the burrs and provide the chamfered surface. There are no rigid specifications followed by all manufacturers in the reaming operation, and hence the outer diameter of the chamfered surface varies greatly between different manufacturers and between the products of a given manufacturer. It is therefore an object of the present invention to provide a pipe coupler suitable for use with the pipes of different manufacturers, and suitable for use with pipes having chamfered surfaces with greatly varying outer diameters.

These and further objects of the present invention will become readily apparent from a further consideration of this specification, particularly when viewed in the light of the drawings, in which:

FIGURE 1 is a longitudinal sectional view through a fitting embodying the invention herein;

FIGURE 2 is an end elevational view of the pipe coupler illustrated in FIGURE 1; and FIGURE 3 is a longitudinal sectional view taken through another form of fitting embodying the present invention.

Referring to FIGURE 1 of the drawing, a pipe coupler is illustrated which includes a body member 11 having a cylindrical threaded male extension 12 at one end and a second cylindrical threaded male extension 13 disposed about the same axis at the other end thereof. The body member 11 has a central portion 14 which is hexagonal in cross section as seen in FIGURE 2 for the application thereto of any suitable torque transmitting tool. The body 11 has a cylindrical channel 15 which extends therethrough coaxial with the extensions 12 and 13.

Each of the threaded extensions 12 and 13 is provided with threads 16 adapted to cooperate with mating threads 17 of a female threaded member or pipe 18. In the particular construction herein described, the threads 16 and 17 are of the National Standard type, which when engaged must be provided with some sort of pipe thread compound to provide a fluid-tight joint, and such threads also require substantial torques when engaging the coupler and pipe. As will become apparent hereinafter, by means of the construction of the present invention, such pipe thread compound is eliminated and the extreme threading pressures required to engage the threads of the coupler and pipe are greatly lowered.

The center portion 14 of the coupler has a pair of spaced parallel flat surfaces or shoulders 19 and 21. These shoulders 19 and 21 are each provided with a toroidal shaped seat or groove 22 which has an approximately semicircular cross-section although it is to be understood that the groove may have other shapes also, such as rectangular, as long as it accommodated the ring. A toroidal shaped sealing ring 23 is disposed in each groove 22, and is constructed of a suitable elastomer material, such as rubber or the like. The female threaded member, or pipe 18, has a chamfered surface 24 formed on the inner surface and the end of said pipe, the end being on a plane normal to the axis of the pipe and being designated 26. This end 26 of the pipe 18 abuts the shoulder 19 of the coupler.

The toroidal sealing ring 23 has a radius approximately equal to the radius of the groove 22, and therefore approximately half of the sealing ring 23 extends from the shoulder 19 or 21 of the coupler. Each of the extensions 12 and 13 have cylindrical portions 27 which have a smaller diameter than the diameter of the roots of the threads 16 of the extensions. Also, the cylindrical portions have the same diameter as the inner diameter of the groove 22.

As stated above, the elastomer ring 22 must be disposed in a cavity of greater volume than the ring. Unless this is true, the elastomer ring 22 will be defaced and cut by tightening the pipe or female member 18 in abutment with the coupler. As illustrated in FIGURE 1, the cavity for the elastomer ring is of greater volume than the ring due to the fact that a space is provided between the teeth 17 of the female member and the cylindrical surface 27 of the coupler. The Bashark patent indicates that it is desirable to have a sealing ring with a relatively small diameter in relation to the height of the threads of the coupler and pipe, however, this patent also recognizes that as a practical matter the ring cannot be reduced to too small a size with respect to the size of the threads, since a point is quickly reached where small differences in mechanical tolerances determining the size of the ring and the cavity begin to be too important in determining the resulting deformation of the sealing ring. In the present invention, the outer diameter of the sealing ring must not greatly exceed the outer diameter of the chamfered surface 24 or the O-ring will be pinched between the end 26 of the pipe 18 and the shoulder 19.

The inventer has found that the distance between the inner diameter of the groove (or cylindrical surface 27) and the outer diameter of the groove 22 must be at least equal to the height of the threads 16 and no greater than three times the height of the threads to form a seal and avoid pinching of the O-ring 23 between the end 26 of the pipe 18 and the shoulder 19. An O-ring with a diameter between one and three times the height of the threads thus may be used to provide a coupling between a coupler and a standard pipe because of the fact that the cylindrical surface 27 has a smaller diameter than the diameter of the root of the threads of the coupler, and therefore, even pipes 18 with shallow chamfered surfaces 24 do not cut or deface the O-ring more forcefully and forces greater deformation of the O-ring. Preferably, the center line of the O-ring is located at a distance from the axis midway between the peaks and roots of the threads. Also, the distance from the cylindrical portion 27 and the roots of the threads must be no greater than the height of the threads. It is also to be noted that the cylindrical surface 27 of the extensions 12 and 13 of the coupler extend from the surface or shoulder 19 along the axis a distance greater than one pitch width in order to assure a cavity for the O-ring 23 greater than the volume of the O-ring.

FIGURE 3 of the drawing illustrates another form of fitting providing a reducing connection between a pair of pipes. This construction of the invention has a portion 14A similar to the portion 14 of FIGURES 1 and 2 with a hexagonal cross-section for the engagement of a torque transmitting tool. The portion 14A has a shoulder 19A corresponding to the shoulder 19 of the first embodiment, and the shoulder 19A is provided with an annular groove or seat 22A for a toroidal shaped sealing ring 23A. An extension 12A corresponding to the extension 12 of the first embodiment of the invention is adapted to cooperate with a female threaded pipe, not shown, as in the manner illustrated in FIGURE 1 for the extension 12. The portion 12A is tapped at 28 to receive the threaded end of a second pipe, also not shown.

The annular groove 22A has an approximately rectangular cross-section, the corners 30 of the groove being slightly rounded. Also, the sealing ring 23A has a circular cross-section with a diameter approximately equal to the difference in the inner diameter and outer diameter of the groove 22A. As a result, a space 32 exists between the sealing ring 23A and the corners 30 of the groove 22A when the sealing ring is not under heavy compression. This additional space 32 permits the sealing ring to be compressed to a greater degree than the construction of FIGURE 1 without pinching or defacing the elastomer ring. It is, however, necessary that the radius of the sealing ring 23A is no greater than the distance between the shoulder 19A and the corners 30 of the groove 22A so that no more than half the cross-section of the sealing ring 23A protrudes from the groove.

The present invention has been illustrated in a specific manner, but it is to be understood that other constructions may also be employed within the scope of the invention. For example, it is clear that the present invention may be applied to other types of fittings than couplers between female pipes. It is therefore intended that the scope of the present invention be not limited by the foregoing embodiments, but rather only by the appended claims.

The invention claimed is:

1. A fluid coupler comprising a member having a passage extending therethrough and first and second external cylindrical portions extending on a common central axis about the passage, the first cylindrical portion being disposed at one end of the member and having outwardly extending threads thereon adapted to mate with the threads of a female member, said member having an integral outwardly extending portion with a flat surface confronting and normal to the axis of the second cylindrical portion, the second cylindrical portion extending from the flat surface axially a distance greater than one pitch width and having a diameter less than the diameter of the roots of the threads on the first cylindrical portion of said member, the second cylindrical portion being spaced from the surface of the roots of the threads by a distance no greater than the height of the threads, said member having an outwardly facing annular groove in the flat surface with an inner diameter approximately equal to the diameter of the second cylindrical portion and an outer diameter greater than the inner diameter by a distance between one and three times the height of the threads, said groove being so located in said flat surface that the inner diameter portion forms a smooth continuation of said second cylindrical portion, and an elastomer ring disposed in the annular groove having an inner radius substantially the same as the cylindrical portion, said ring having a thickness in the plane of the flat surface approximately equal to the difference in the inner and outer diameters of the groove and extending from the groove a distance no greater than one-half of said thickness.

2. A coupler comprising the elements of claim 1 wherein the groove has an approximately semicircular cross-section and the elastomer ring has a circular cross-section.

3. A fluid conducting device comprising a male member and a female member, the female member having a flat surface and a passage with a cylindrical surface extending therein from and normal to the flat surface, said female member also having an annular chamfered surface sloping inwardly from the flat surface to the cylindrical surface of the passage and threads on the cylindrical surface of the passage extending from the chamfered surface, the male member having a passage extending therethrough and first and second external cylindrical portions extending on a common axis about the passage, the first cylindrical portion being disposed at one end of the male member and having outwardly extending threads thereon mating with the threads of said female member, said male member having an integral outwardly extending portion with a flat surface confronting and normal to the axis of the last mentioned cylindrical portions, the second cylindrical portion extending axially a distance greater than one pitch width from the second mentioned threads and terminating in the radial plane of said second mentioned flat surface and having a diameter less than the diameter of the roots of the threads on the first cylindrical portion of said male member, the cylindrical portion being spaced from the roots of the threads by a distance no greater than the height of the threads, said male member having an outwardly facing annular groove in the flat surface with an inner diameter approximately equal to the diameter of the second cylindrical portion and an outer diameter greater than the inner diameter by a distance between one and three times the height of the threads, and so located in said flat surface that the inner diameter portion forms a smooth continuation of said second cylindrical portion, and an elastomer ring disposed in the annular groove having an inner radius substantially the same as the second cylindrical portion and a cross-section greater than the groove, said ring having a thickness in the plane of the flat surface approximately equal to the difference in the inner and outer diameters of the groove and extending normally from the flat surface a distance no greater than one-half the difference in the inner and outer diameters of the groove, said male member being disposed within the cylindrical passage of the female member with the threads of the first cylindrical portion of the male member engaging the threads of the passage of the female member, the combined length of the first and second cylindrical portions of the male member being no greater than the threaded portion of the female member, and the flat surface of the outwardly extending portion of the male member abutting the flat surface of the female member and the elastomer ring abutting the chamfered surface of the female member and not more than partially filling the space between the second cylindrical portion of the male member and the female member, whereby the elastomer ring forms a seal between the male and female members without defacing the ring.

4. A fluid conducting device comprising the elements of claim 3 wherein the groove of the male member has a semicircular cross-section and the elastomer ring has a circular cross-section.

5. A fluid coupler comprising the elements of claim 1 wherein the groove has an approximately rectangular cross-section and the elastomer ring has an approximately circular cross-section.

6. A fluid conducting device comprising the elements of claim 3 wherein the groove of the male member has an approximately rectangular cross-section and the elastomer ring has an approximately circular cross-section.

7. A fluid conducting device comprising a male member and a female member, the female member having a flat surface and a passage with a cylindrical surface extending therein from and normal to the flat surface, said female member also having an annular chamfered surface sloping inwardly from the flat surface to the cylindrical surface of the passage and threads on the cylindrical surface of the passage extending from the chamfered surface, the male member having a passage extending therethrough and first and second external cylindrical portions extending on a common axis about the passage, the first cylindrical portion being disposed at one end of the male member and having outwardly extending threads thereon adapted to mate with the threads of said female member, adapted to mate with the threads of said female member, said male member having an integral outwardly extending portion with a flat surface confronting and normal to the axis of the last mentioned cylindrical portions, the second cylindrical portion extending axially a distance greater than one pitch width from the second mentioned threads and terminating in the radial plane of said second mentioned flat surface and having a diameter less than the diameter of the roots of the threads on the first cylindrical portion of said male member, said male member having an outwardly facing annular groove in the flat surface with an inner diameter approximately equal to the diameter of the second cylindrical portion and an outer diameter substantially equal to the outer diameter of the chamfered surface of the female member and so located in said flat surface that the inner diameter portion forms a smooth continuation of said second cylindrical portion, and an elastomer ring disposed in the annular groove having an inner radius substantially the same as the second cylindrical portion and a cross-section greater than the groove, said ring filling the groove and extending normally from the flat surface, said male member being disposed within the cylindrical passage of the female member with the threads of the first cylindrical portion of the male member engaging the threads of the passage of the female member, the combined length of the first and second cylindrical portions of the male member being no greater than the threaded portion of the female member, and the flat surface of the outwardly extending portion of the male member abutting the flat surface of the female member and the elastomer ring abutting the chamfered surface of the female member and only partially filling the space between the second cylindrical portion of the male member and the female member, whereby the elastomer ring forms a seal between the male and female members without defacing the ring.

8. A coupler for engaging a female member provided with a flat surface and a passage with a cylindrical surface extending from and normal to the flat surface, the female member also having an annular chamfered surface sloping inwardly from the flat surface to the cylindrical surface of the passage and threads on the cylindrical surface of the passage extending from the chamfered surface comprising a male member having a passage extending therethrough and first and second external cylindrical portions extending on a common axis about the passage, the first cylindrical portion being disposed at one end of the male member and having outwardly extending threads thereon adapted to mate with the threads of a female member, said male member having an outwardly extending portion with a flat surface confronting and normal to the axis of the last mentioned cylindrical portions, the second cylindrical portion extending axially a distance greater than one pitch width from the second mentioned threads and terminating in a radial plane of said second mentioned flat surface and having a diameter less than the diameter of the roots of the threads on the first cylindrical portion of said male member, said male member having an outwardly facing annular groove in the flat surface with an inner diameter approximately equal to the diameter of the second cylindrical portion and an outer diameter greater than the diameter of the roots of the threads of the first cylindrica portion and adapted to substantially align with the outer diameter of the chamfered surface of a female member and so located in said flat surface that the inner diameter portion forms a smooth continuation of the second cylindrical portion, and an elastomer ring disposed in the annular groove having an inner radius substantially the same as the second cylindrical portion and a cross-section greater than the groove, said ring filling the groove and extending normally from the flat surface, said male member being adapted to be disposed within the cylindrical passage of a female member with the threads of the first cylindrical portion of the male member engaging the threads of the passage of the female member, the combined length of the first and second cylindrical portions being no greater than the threaded portion of the female member, and the flat surface of the outwardly extending portion of the male member being adapted to abut the flat surface of a female member, whereby the elastomer ring will abut the chamfered surface of the female member and only partially fill the space between the second cylindrical portion of the male member and the female member to form a seal between the male and female members without defacing the ring.

References Cited in the file of this patent

UNITED STATES PATENTS

| | | |
|---|---|---|
| 1,718,662 | Oakley | June 25, 1929 |
| 2,110,825 | Archer | Mar. 8, 1938 |
| 2,343,235 | Bashark | Feb. 29, 1944 |

OTHER REFERENCES

Parker, O-Ring Catalog #903, page 44.